United States Patent
Lee et al.

(10) Patent No.: US 10,551,537 B2
(45) Date of Patent: Feb. 4, 2020

(54) COMPOSITION FOR OPTICAL FILM, AND FILMS AND DISPLAY DEVICE

(71) Applicant: SAMSUNG ELECTRONICS CO., LTD., Suwon-si, Gyeonggi-do (KR)

(72) Inventors: Eun Sung Lee, Hwaseong-si (KR); Sang Ho Park, Anyang-si (KR); Koh Kamada, Suwon-si (KR); Tsuyoshi Ohyama, Suwon-si (KR); Seungbum Chun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 547 days.

(21) Appl. No.: 14/802,388

(22) Filed: Jul. 17, 2015

(65) Prior Publication Data

US 2016/0200981 A1    Jul. 14, 2016

(30) Foreign Application Priority Data

Jan. 9, 2015  (KR) .................. 10-2015-0003679

(51) Int. Cl.
*C09K 19/56* (2006.01)
*G02B 5/30* (2006.01)
(Continued)

(52) U.S. Cl.
CPC ........ *G02B 5/3016* (2013.01); *B32B 2457/20* (2013.01); *B32B 2457/202* (2013.01);
(Continued)

(58) Field of Classification Search
CPC ............... G02B 5/3016; C09K 19/408; C09K 2219/03; C09K 2019/3083;
(Continued)

(56) References Cited

U.S. PATENT DOCUMENTS 5,805,253 A    9/1998  Mori et al.
6,890,608 B2   5/2005  Morishima et al.
(Continued)

FOREIGN PATENT DOCUMENTS

JP    11281984    10/1999
JP    3118197     10/2000
(Continued)

OTHER PUBLICATIONS

F. Reichel, et al. "The thermodynamic stability of amorphous oxide overgrowths on metals", Acta Materialia 56 (2008) 659-674.

*Primary Examiner* — Eli D. Strah
(74) *Attorney, Agent, or Firm* — Cantor Colburn LLP

(57) ABSTRACT

A composition for an optical film including a liquid crystal and a polysiloxane represented by Chemical Formula 1

Chemical Formula 1

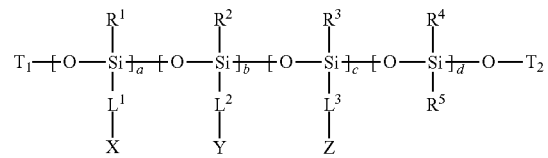

wherein in Chemical Formula 1, $R^1$ to $R^5$, $L^1$ to $L^3$, X, Y, Z, $T^1$, $T^2$, a, b, c, and d are the same as described in the detailed description.

15 Claims, 9 Drawing Sheets

(51) Int. Cl.
*C09K 19/20* (2006.01)
*G02F 1/13363* (2006.01)
*G02F 1/1335* (2006.01)
*C08L 83/04* (2006.01)
*C08L 83/10* (2006.01)
*C08L 83/06* (2006.01)
*C08G 77/44* (2006.01)
*C08G 77/04* (2006.01)
*C08G 77/18* (2006.01)
*C08G 77/42* (2006.01)
*C08G 77/14* (2006.01)

(52) U.S. Cl.
CPC ........ *B32B 2457/206* (2013.01); *C08G 77/04* (2013.01); *C08G 77/14* (2013.01); *C08G 77/18* (2013.01); *C08G 77/42* (2013.01); *C08G 77/44* (2013.01); *C08L 83/04* (2013.01); *C08L 83/06* (2013.01); *C08L 83/10* (2013.01); *C09K 2019/2035* (2013.01); *G02F 1/1335* (2013.01); *G02F 1/13363* (2013.01); *G02F 1/133502* (2013.01); *G02F 2001/133633* (2013.01); *Y10T 428/1036* (2015.01); *Y10T 428/1045* (2015.01)

(58) Field of Classification Search
CPC .... C09K 2019/2078; C09K 2019/0448; C09K 2019/2035; C08G 77/42; C08G 77/18; C08G 77/14; C08G 77/44; C08G 77/04; C08G 77/38; C08L 83/06; C08L 83/10; C08L 83/04; C08L 2203/16; G02F 1/1335; G02F 1/133502; G02F 1/13363; G02F 2001/133633; Y10T 428/1045; Y10T 428/1036; B32B 2457/20; B32B 2457/202; B32B 2457/206
See application file for complete search history.

(56) References Cited

U.S. PATENT DOCUMENTS

| | | | |
|---|---|---|---|
| 7,311,949 B2 | 12/2007 | Yoshizawa et al. | |
| 7,311,950 B2 | 12/2007 | Morishima et al. | |
| 7,598,314 B2 | 10/2009 | Lee et al. | |
| 7,799,242 B2 | 9/2010 | Shimoda et al. | |
| 8,568,892 B2 | 10/2013 | Zhao et al. | |
| 8,828,507 B2 | 9/2014 | He et al. | |
| 8,926,091 B2 | 1/2015 | Kumar et al. | |
| 2002/0039628 A1 | 4/2002 | Ogawa | |
| 2005/0157234 A1 | 7/2005 | Park | |
| 2008/0152843 A1* | 6/2008 | Kato | C09K 19/2007 428/1.4 |
| 2009/0033839 A1* | 2/2009 | Fukuda | C09K 19/348 349/102 |
| 2010/0051866 A1* | 3/2010 | Hirai | C09K 19/2007 252/299.63 |
| 2010/0075070 A1 | 3/2010 | Nagai et al. | |
| 2013/0229605 A1* | 9/2013 | Do | G02B 5/3016 349/119 |
| 2014/0002773 A1* | 1/2014 | Hirai | C09K 19/3809 349/76 |

FOREIGN PATENT DOCUMENTS

| | | |
|---|---|---|
| JP | 2001330725 A | 11/2001 |
| KR | 19910006012 | 7/1990 |
| KR | 20000029598 A | 5/2000 |
| KR | 20070076832 A | 7/2007 |
| KR | 20080033499 A | 4/2008 |
| KR | 20100036113 A | 4/2010 |
| KR | 1040457 B1 | 6/2011 |
| KR | 1380146 B1 | 3/2014 |

* cited by examiner

COMPOSITION FOR OPTICAL FILM, AND FILMS AND DISPLAY DEVICE

CROSS-REFERENCE TO RELATED APPLICATIONS

This application claims priority to and the benefit of Korean Patent Application No. 10-2015-0003679 filed in the Korean Intellectual Property Office on Jan. 9, 2015, the entire contents of which are incorporated herein by reference.

BACKGROUND

1. Field

A composition for an optical film, a film, and a display device are disclosed.

2. Description of the Related Art

Commonly used flat panel displays may be classified into a light-emitting display device emitting light by itself and a non-emissive display device requiring a separate light source. An optical film, such as a retardation film, is frequently employed for improving the image quality thereof.

The visibility and the contrast ratio of the light emitting display device, for example, an organic light emitting display, may be deteriorated by reflection of external light caused by a metal such as an electrode. In order to reduce or prevent reflection of the external light by the organic light emitting display and leakage thereof to the outside, the linear polarized light is changed into circularly polarized light by using a polarizer and an optical film.

A liquid crystal display (LCD) as a non-emissive display device uses an optical film and compensates retardation generated by liquid crystals thereby, thus securing a wide viewing angle.

An optical film obtained by stacking polymer films having different refractive indexes has been researched. However, stacking polymer films results in an optical film of the increased thickness to a thick display device. In addition, the stacked optical film requires an additional process of adhering the polymer films by using an adhesion layer and the like, after respectively manufacturing the polymer films, and thus may bring about a display defect due to a stain by the adhesion, mixing of a foreign material, and the like, as well as needing a complex process.

There remains a need in a thin optical film with improved display characteristics for use in a display device.

SUMMARY

An embodiment provides a composition for an optical film capable of simplifying a process and improving display characteristics without increasing thickness of the optical film.

Another embodiment provides an optical film capable of simplifying a process and improving display characteristics without a thickness increase.

Yet another embodiment provides a compensation film including the optical film.

Still another embodiment provides an antireflective film including the optical film or the compensation film.

According to an embodiment, a composition for an optical film includes a liquid crystal and a polysiloxane represented by Chemical Formula 1.

Chemical Formula 1

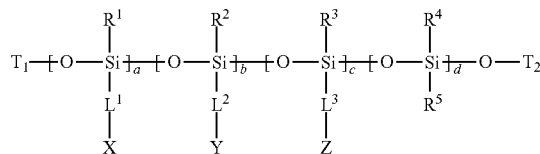

In Chemical Formula 1, $R^1$ to $R^5$ are each independently hydrogen, a substituted or unsubstituted C1 to C10 alkyl group, a substituted or unsubstituted C6 to C30 aryl group, or a combination thereof, wherein $R^4$ and $R^5$ are each independently present or are linked to each other to form a ring, $L^1$ to $L^3$ are each independently a single bond, a substituted or unsubstituted C1 to C10 alkylene group, a substituted or unsubstituted C2 to C10 alkenylene group, a substituted or unsubstituted C2 to C10 alkynylene group, or a combination thereof, X is a substituted or unsubstituted C3 to C20 alkyl group, Y is $-(OC_pH_{2p})_kOCH_3$, wherein p is 1 to 5 and k is 0 to 10, Z is a substituted or unsubstituted C6 to C30 aryl group, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, $0 \leq a < 1$, $0 \leq b \leq 0.5$, $0 \leq d \leq 0.5$, and provided that $a+b+c+d=1$.

The polysiloxane may be represented by one of Chemical Formulae 1a to 1c.

Chemical Formula 1a

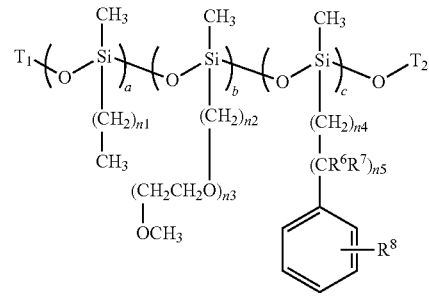

Chemical Formula 1b

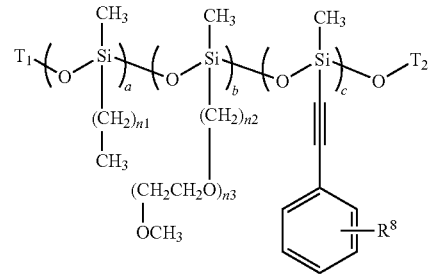

Chemical Formula 1c

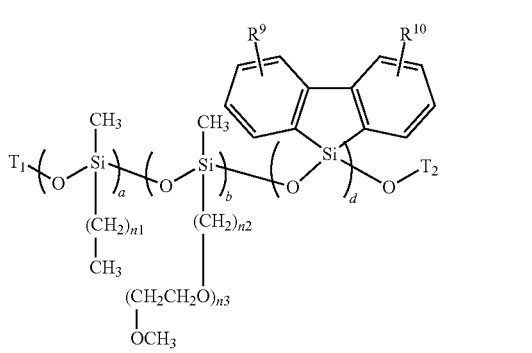

In Chemical Formulae 1a to 1c, $R^6$ to $R^{10}$ are each independently hydrogen, a substituted or unsubstituted C1 to C10 alkyl group, a substituted or unsubstituted C6 to C30 aryl group, or a combination thereof, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, n1 to n5 are each independently 0 to 10, $0 \leq a < 1$, $0 \leq b \leq 0.5$, $0 \leq c \leq 0.5$, $0 \leq d \leq 0.5$, and provided that $a+b+c+d=1$.

The liquid crystal may include at least one of a first liquid crystal represented by Chemical Formula A, a second liquid crystal represented by Chemical Formula B, and a third liquid crystal represented by Chemical Formula C.

$L^4$ to $L^9$ are each independently a single bond, —C(=O)O—, or —(O=C)O—, e, h, p, $k_1$, and $k_2$ are each independently 1 to 10, and f, i, $I_1$, $I_2$, and q are each independently 0 or 1.

The liquid crystal may include the first liquid crystal, the second liquid crystal, and the third liquid crystal, and the liquid crystal may include about 10 to about 35 percent by weight of the first liquid crystal, about 10 to about 35 percent by weight of the second liquid crystal, and about 30 to about 80 percent by weight of the third liquid crystal based on the total amount of the liquid crystal.

The composition may further include a solvent, and the composition may include about 5 to about 50 percent by weight of the liquid crystal, about 0.001 to about 30 percent by weight of the polysiloxane, and the remaining amount of solvent based on the total amount of the composition.

According to another embodiment, an optical film includes a liquid crystal layer including a liquid crystal and a polysiloxane represented by Chemical Formula 1.

Chemical Formula 1

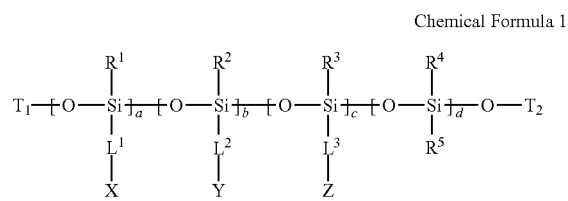

In Chemical Formula 1, $R^1$ to $R^5$ are each independently hydrogen, a substituted or unsubstituted C1 to C10 alkyl group, a substituted or unsubstituted C6 to C30 aryl group, or a combination thereof, Chemical Formula A

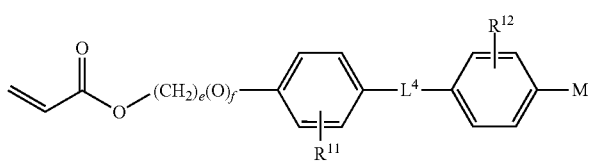

Chemical Formula B

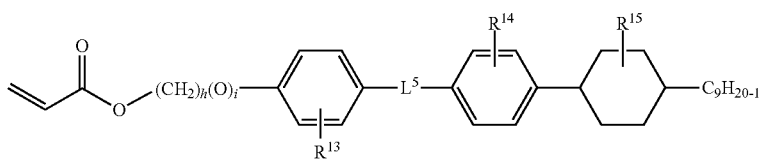

Chemical Formula C

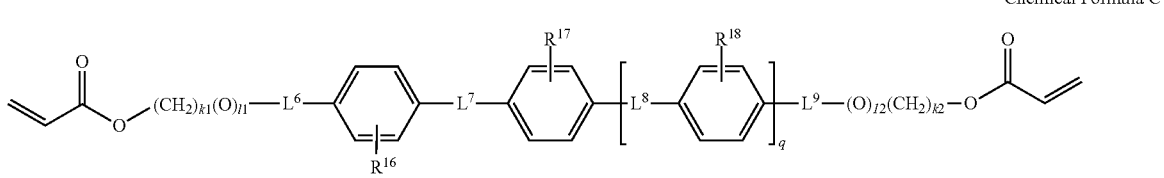

In Chemical Formulae A to C,

M is a cyano group, a cyano-containing group, a hydroxy group, a substituted or unsubstituted carboxyl group, or a combination thereof, $R^{11}$ to $R^{18}$ are each independently hydrogen, a substituted or unsubstituted C1 to C10 alkyl group, a substituted or unsubstituted C1 to C10 alkoxy group, a halogen atom, a halogen-containing group, or a combination thereof, wherein $R^4$ and $R^5$ are each independently present or are linked to each other to form a ring, $L^1$ to $L^3$ are each independently a single bond, a substituted or unsubstituted C1 to C10 alkylene group, a substituted or unsubstituted C2 to C10 alkenylene group, a substituted or unsubstituted C2 to C10 alkynylene group, or a combination thereof, X is a substituted or unsubstituted C3 to C20 alkyl group, Y is $-(OC_pH_{2p})_kOCH_3$, wherein p is 1 to 5 and k is 0 to 10, Z is a substituted or unsubstituted C6 to C30 aryl group, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, $0 \leq a < 1$, $0 \leq b \leq 0.5$, $0 \leq c \leq 0.5$, $0 \leq d \leq 0.5$, and provided that a+b+c+d=1.

The liquid crystal layer may satisfy Relationship Equation 1.

$$n_x > n_z > n_y \quad \text{Relationship Equation 1}$$

In Relationship Equation 1, $n_x$ is a refractive index of the liquid crystal layer at a slow axis, $n_y$ is a refractive index of the liquid crystal layer at a fast axis, and $n_z$ is a refractive index in a direction perpendicular to $n_x$ and $n_y$.

The liquid crystal layer may satisfy Relationship Equation 2.

$$0 < n_x - n_z / n_x - n_y < 1 \quad \text{Relationship Equation 2}$$

In Relationship Equation 2, $n_x$ is a refractive index of the liquid crystal layer at a slow axis, $n_y$ is a refractive index of the liquid crystal layer at a fast axis, and $n_z$ is a refractive index in a direction perpendicular to $n_x$ and $n_y$.

The liquid crystal layer may satisfy Relationship Equation 2a.

$$0.3 \leq n_x - n_z / n_x - n_y < 0.65 \quad \text{Relationship Equation 2}$$

In Relationship Equation 2a, $n_x$ is a refractive index of the liquid crystal layer at a slow axis, $n_y$ is a refractive index of the liquid crystal layer at a fast axis, and $n_z$ is a refractive index in a direction perpendicular to $n_x$ and $n_y$.

The liquid crystal may have an obliquely tilted optical axis with respect to the surface of the liquid crystal layer.

The liquid crystal layer may include:

a first side and a second side facing the first side, wherein a tilt angle of the liquid crystal may become gradually larger from the first side to the second side.

The maximum tilt angle of the liquid crystals may range from about 40° to about 70°.

The tilt angle of the liquid crystals positioned at the first side may be greater than about 0° and less than or equal to about 5°.

The optical film may further include an alignment layer contacting the first side of the liquid crystal layer.

The polysiloxane may be positioned on the surface of the liquid crystal layer.

The polysiloxane may be represented by one of Chemical Formulae 1a to 1c.

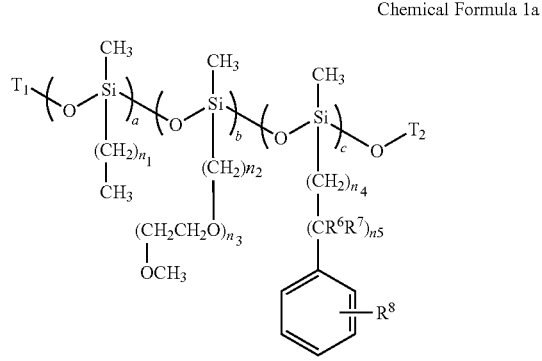

Chemical Formula 1a

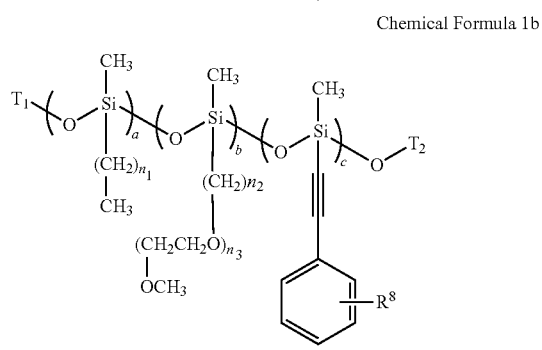

Chemical Formula 1b

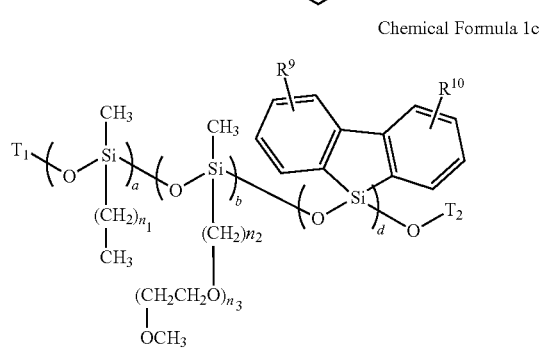

Chemical Formula 1c

In Chemical Formulae 1a to 1c, $R^6$ to $R^{10}$ are each independently hydrogen, a substituted or unsubstituted C1 to C10 alkyl group, a substituted or unsubstituted C6 to C30 aryl group, or a combination thereof, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, n1 to n5 are each independently 0 to 10, $0 \leq a < 1$, $0 \leq b \leq 0.5$, $0 \leq c \leq 0.5$, $0 \leq d \leq 0.5$, provided that a+b+c+d=1.

The liquid crystal may include at least one of a first liquid crystal represented by Chemical Formula A, a second liquid crystal represented by Chemical Formula B, and a third liquid crystal represented by Chemical Formula C.

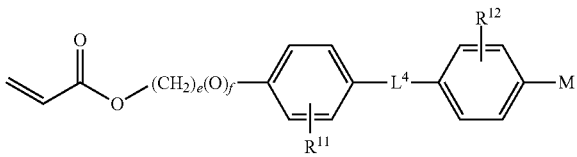

Chemical Formula A

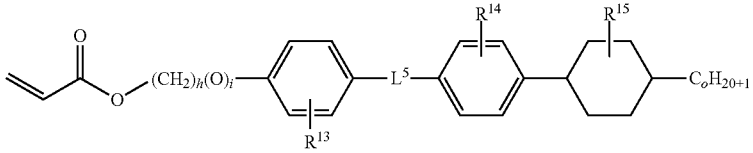

Chemical Formula B

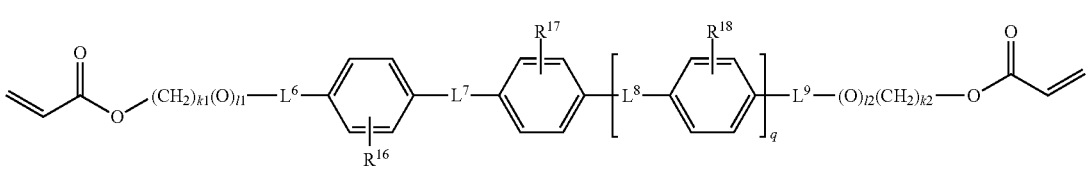

Chemical Formula C

In Chemical Formulae A to C,

M is a cyano group, a cyano-containing group, a hydroxy group, a substituted or unsubstituted carboxyl group, or a combination thereof, $R^{11}$ to $R^{18}$ are each independently hydrogen, a substituted or unsubstituted C1 to C10 alkyl group, a substituted or unsubstituted C1 to C10 alkoxy group, a halogen atom, a halogen-containing group, or a combination thereof, $L^4$ to $L^9$ are each independently a single bond, —C(=O)O—, or —(O=C)O—, e, h, p, $k_1$, and $k_2$ are each independently 1 to 10, and f, i, $I_1$, $I_2$, and q are each independently 0 or 1.

The liquid crystal may include the first liquid crystal, the second liquid crystal, and the third liquid crystal, and the liquid crystal may include about 10 to about 35 percent by weight of the first liquid crystal, about 10 to about 35 percent by weight of the second liquid crystal, and about 30 to about 80 percent by weight of the third liquid crystal based on the total amount of the liquid crystal.

According to another embodiment, an antireflective film includes the optical film and a polarizer on one side of the optical film.

According to yet another embodiment, a display device includes a display panel, and the optical film or the antireflective film.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
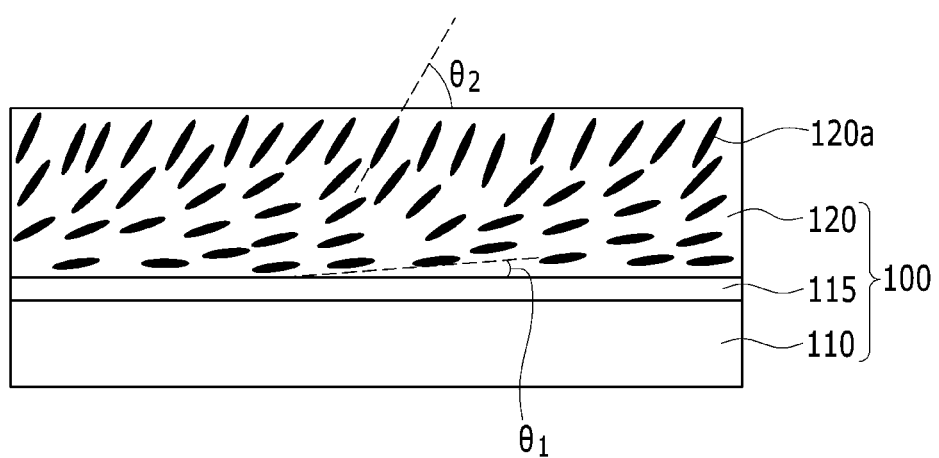
FIG. 1 is a cross-sectional view showing an optical film according to an embodiment.

Exemplary embodiments will hereinafter be described in detail, and may be readily performed by those who have common knowledge in the related art. However, this disclosure may be embodied in many different forms and should not be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as at least one of when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a definition is not otherwise provided, the term "substituted" refers to one substituted with at least one substituent selected from a halogen atom (F, Br, Cl, or I), a hydroxy group, a C1 to C20 alkoxy group, a cyano group, an amino group, a C1 to C20 alkyl group, a C2 to C20 alkenyl group, a C2 to C20 alkynyl group, a C6 to C20 aryl group, a C3 to C20 heteroaryl group, and a combination thereof, instead of hydrogen of a compound.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "alkoxy" represents "alkyl-O—", wherein the term "alkyl" has the same meaning as described above.

As used herein, the term "alkenyl group" may refer to a straight or branched chain, monovalent hydrocarbon group having at least one carbon-carbon double bond.

As used herein, the term "alkynyl group" may refer to a straight or branched chain, monovalent hydrocarbon group having at least one carbon-carbon triple bond.

As used herein, the term "aryl", which is used alone or in combination, may refer to an aromatic hydrocarbon containing at least one ring and having the specified number of carbon atoms.

As used herein, the term "alkylene group" may refer to a straight or branched saturated aliphatic hydrocarbon group having a valence of at least two, optionally substituted with one or more substituents where indicated, provided that the valence of the alkylene group is not exceeded.

As used herein, the term "alkenylene group" may refer to a straight or branched aliphatic hydrocarbon group having a valence of at least two, having at least one carbon-carbon double bond, optionally substituted with one or more substituents where indicated, provided that the valence of the alkenylene group is not exceeded.

As used herein, the term "alkynylene group" may refer to a straight or branched aliphatic hydrocarbon group having a valence of at least two, having at least one carbon-carbon triple bond, optionally substituted with one or more substituents where indicated, provided that the valence of the alkynylene group is not exceeded.

As used herein, when a definition is not otherwise provided, the term "silyl" represents group "$R_3$—Si—", wherein R is alkyl, alkenyl, alkynyl, aryl, or a combination thereof, wherein the terms "alkyl", "alkenyl", "alkynyl", and "aryl" have the same meaning as described above.

Hereinafter, a composition for an optical film according to an embodiment is described.

A composition for an optical film according to an embodiment includes at least one liquid crystal and a polysiloxane.

The liquid crystal may have a rod shape extending in one direction, and may be, for example, a monomer, an oligomer, and/or a polymer. The liquid crystal may have, for example, positive or negative birefringence values ($\Delta n$), wherein the birefringence ($\Delta n$) is a difference between the refractive index ($n_o$) of light propagating in the direction perpendicular to an optical axis from the refractive index ($n_e$) of light propagating in the direction parallel to the optical axis.

The liquid crystal may be a reactive mesogenic liquid crystal, and may include, for example, at least one mesogenic moiety and at least one polymerizable functional group. The reactive mesogenic liquid crystal may include at least one of, for example, a rod-shaped aromatic derivative having at least one reactive cross-linking group, propylene glycol 1-methyl, propylene glycol 2-acetate, and a compound represented by formula $P^1$-$A^1$-$(Z^1$-$A^2)_n$-$P^2$ (wherein $P^1$ and $P^2$ independently include a polymerizable functional group such as acrylate, methacrylate, acryloyl, vinyl, vinyloxy, epoxy, or a combination thereof, $A^1$ and $A^2$ independently include 1,4-phenylene, a naphthalene-2,6-diyl group, or a combination thereof, $Z^1$ includes a single bond, —C(=O)O—, —(O=C)O—, or a combination thereof, and n is 0, 1, or 2), but is not limited thereto.

The liquid crystal may be a thermosetting liquid crystal or a photocurable liquid crystal. For example, a photocurable liquid crystal may be used. When the liquid crystal is a photocurable liquid crystal, the light may include ultraviolet rays having a wavelength ranging from about 250 nanometers (nm) to about 400 nm.

The liquid crystal may include one or more kinds of liquid crystals.

For example, the liquid crystal may include at least one of a first liquid crystal represented by the following Chemical Formula A, a second liquid crystal represented by the following Chemical Formula B, and a third liquid crystal represented by the following Chemical Formula C.

and about 10 to about 90 wt % of the second liquid crystal based on the total amount of the liquid crystal.

For example, the liquid crystal may include the first liquid crystal, the second liquid crystal, and the third liquid crystal, and may include, for example, about 10 to about 35 wt % of the first liquid crystal, about 10 to about 35 wt % of the second liquid crystal, and about 30 to about 80 wt % of the third liquid crystal based on the total amount of the liquid crystal.

The liquid crystal may be included in an amount of about 5 to about 50 wt % based on the total amount of the composition. Within the range, it may be included in an amount of about 5 to about 40 wt % or about 10 to about 35 wt %. While not wishing to be bound by a theory, when the liquid crystal is included within the above ranges, optical properties of an optical film may be further improved.

Chemical Formula A

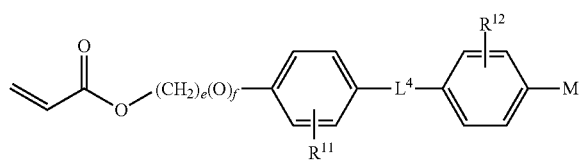

Chemical Formula B

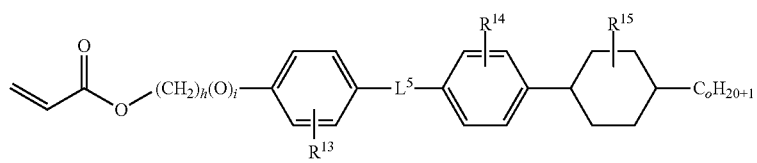

Chemical Formula C

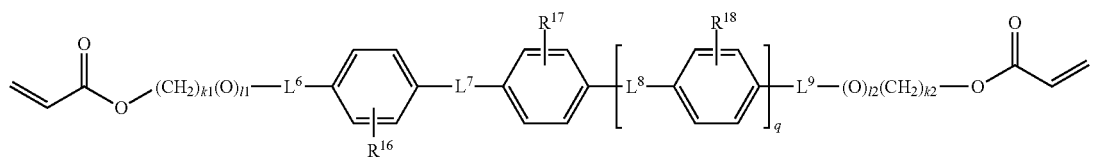

In Chemical Formulae A to C,

M is a cyano group, a cyano-containing group, a hydroxy group, a substituted or unsubstituted carboxyl group, or a combination thereof, $R^{11}$ to $R^{18}$ are each independently hydrogen, a substituted or unsubstituted C1 to C10 alkyl group, a substituted or unsubstituted C1 to C10 alkoxy group, a halogen atom, a halogen-containing group, or a combination thereof, $L^4$ to $L^9$ are each independently a single bond, —C(=O)O—, or —(O=C)O—, e, h, p, $k_1$, and $k_2$ are each independently 1 to 10, and f, i, $I_1$, $I_2$, and q are each independently 0 or 1.

For example, the liquid crystal may include the first liquid crystal and the third liquid crystal, and may include, for example, include about 10 to about 90 percent by weight (wt %) of the first liquid crystal and about 10 to about 90 wt % of the third liquid crystal based on the total amount of the liquid crystal.

For example, the liquid crystal may include the second liquid crystal and the third liquid crystal, and may include, for example, about 10 to about 90 wt % of the second liquid crystal and about 10 to about 90 wt % of the third liquid crystal based on the total amount of the liquid crystal.

For example, the liquid crystal may include the first liquid crystal and the second liquid crystal, and may include, for example, about 10 to about 90 wt % of the first liquid crystal The polysiloxane may be represented by the following Chemical Formula 1.

Chemical Formula 1

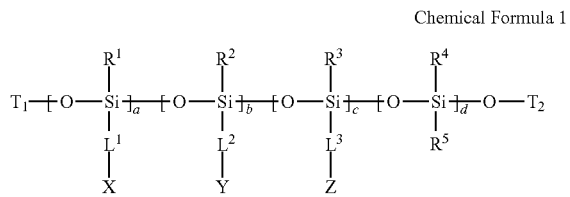

In Chemical Formula 1, $R^1$ to $R^5$ are each independently hydrogen, a substituted or unsubstituted C1 to C10 alkyl group, a substituted or unsubstituted C6 to C30 aryl group, or a combination thereof, $R^4$ and $R^5$ are each independently present or are linked to each other to form a ring (thus, $R^4$ and $R^5$ may be each independently present or are linked to each other to form a ring), $L^1$ to $L^3$ are each independently a single bond, —O—, —C(=O)—, —C(=O)O—, —(O=C)O—, a substituted or unsubstituted C1 to C10 alkylene group, a substituted or unsubstituted C2 to C10 alkenylene group, a substituted or unsubstituted C2 to C10 alkynylene group, or a combination thereof, X is a substituted or unsubstituted C3 to C20 alkyl group, Y is —$(OC_pH_{2p})_kOCH_3$, wherein p is 1 to 5 and k is 0 to 10, Z is a substituted or unsubstituted C6 to C30 aryl group, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, $0 \leq a < 1$, $0 \leq b \leq 0.5$, $0 \leq c \leq 0.5$, $0 \leq d \leq 0.5$, provided that a+b+c+d=1.

The polysiloxane may control alignment properties and/or a refractive index of the liquid crystals that are adjacent to the polysiloxane by two or more side chain groups bound to a siloxane backbone.

For example, in the above Chemical Formula 1, $R^1$ to $R^3$ may each independently be hydrogen or a substituted or unsubstituted C1 to C10 alkyl group, and for example, $R^1$ to $R^3$ may each independently be a methyl group.

For example, in the above Chemical Formula 1, $R^4$ and $R^5$ may each independently be a substituted or unsubstituted C6 to C30 aryl group, and for example $R^4$ and $R^5$ may be linked to each other to form a ring.

For example, in the above Chemical Formula 1, $L^1$ to $L^3$ may each independently be a single bond, a substituted or unsubstituted C1 to C5 alkylene group, a substituted or unsubstituted C2 to C5 alkenylene group, or a substituted or unsubstituted C2 to C5 alkynylene group.

For example, in the above Chemical Formula 1, X may be a substituted or unsubstituted C3 to C10 alkyl group, Y may be —$(OC_2H_4)_kOCH_3$, and Z may be a substituted or unsubstituted phenyl group, a substituted or unsubstituted biphenyl group, or a substituted or unsubstituted naphthyl group.

The polysiloxane may be, for example, represented by one of the following Chemical Formulae 1a to 1c.

Chemical Formula 1a

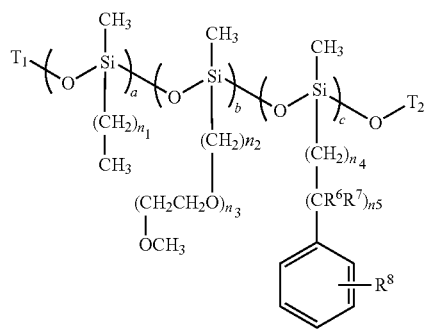

Chemical Formula 1b

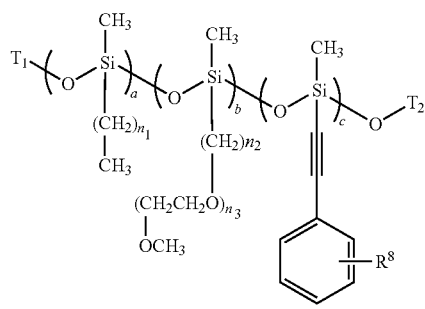

Chemical Formula 1c

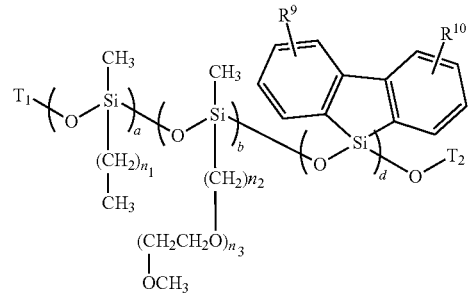

In Chemical Formulae 1a to 1c, $R^6$ to $R^{10}$ are each independently hydrogen, a substituted or unsubstituted C1 to C10 alkyl group, a substituted or unsubstituted C6 to C30 aryl group, or a combination thereof, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, n1 to n5 are each independently 0 to 10, $0 \leq a < 1$, $0 \leq b \leq 0.5$, $0 \leq c \leq 0.5$, $0 \leq d \leq 0.5$, provided that a+b+c+d=1.

The polysiloxane may have a weight average molecular weight of about 1,000 Daltons to about 50,000 Daltons. Within the range, the polysiloxane may have a weight average molecular weight of about 2,000 Daltons to about 30,000 Daltons or about 3,000 Daltons to about 20,000 Daltons.

The polysiloxane may be included in an amount of about 0.001 to about 30 wt % based on the total amount of the composition. Within the range, the polysiloxane may be included in an amount of about 0.01 to about 20 wt %, about 0.05 to about 5 wt %, or about 0.1 to about 3 wt %.

The composition may further include a reaction initiator. The reaction initiator may be, for example, a photoinitiator, for example a free radical photoinitiator and/or an ionic photoinitiator.

The reaction initiator may be included in an amount of about 0.01 to 5 wt % based on the total amount of the composition. Within the above range, the reaction initiator may be included in an amount of about 0.1 to about 4 wt % or about 0.1 to about 2 wt %. While not wishing to be bound by a theory, when the reaction initiator is included within the above ranges, its reactivity may be effectively increased.

The composition may further include an additive. The additive may be a surfactant, a dissolution aid, and/or a dispersing agent, but is not limited thereto.

The composition may further include a solvent that may dissolve and/or disperse the above components. The solvent that may dissolve and/or disperse the above components may not be particularly limited as long as it does not cause physical or chemical damage to the substrate. The solvent may be, for example, at least one selected from deionized water, methanol, ethanol, propanol, isopropanol, 2-methoxyethanol, 2-ethoxyethanol, 2-propoxyethanol, 2-butoxyethanol, methylcellosolve, ethylcellosolve, butylcellosolve, diethylene glycol methyl ether, diethylene glycol ethyl ether, dipropylene glycol methyl ether, toluene, xylene, hexane, heptane, octane, ethyl acetate, butyl acetate, diethylene glycol dimethyl ether, diethylene glycol dimethyl ethyl ether, methyl ethoxy propionate, ethyl ethoxy propionate, ethyl lactate, propylene glycol methyl ether acetate, propylene glycol methyl ether, propylene glycol propyl ether, methyl cellosolve acetate, ethyl cellosolve acetate, diethylene glycol methyl acetate, diethylene glycol ethyl acetate, acetone, methyl ethyl ketone, methyl isobutyl ketone, cyclopentanone, cyclohexanone, dimethyl formamide (DMF), N,N-dimethyl acetamide (DMAc), N-methyl-2-pyrrolidone, γ-butyrolactone, diethyl ether, ethylene glycol dimethyl ether, diglyme, tetrahydrofuran, acetyl acetone, acetonitrile, chloroform, dichloromethane, tetrachloroethane, trichloroethylene, tetrachloroethylene, chlorobenzene, benzene, toluene, and xylene. The solvent may be a single solvent or a mixed solvent.

The solvent may be included in a balance amount other than the above components based on the total amount of the composition.

The composition may be applied on the substrate and may be dried to form a film.

The substrate may be, for example, a glass substrate, a metal substrate, a semiconductor substrate, or a polymer substrate, and the polymer substrate may be, for example, a substrate made of polyethylene terephthalate (PET), polyvinyl alcohol (PVA), polycarbonate (PC), triacetyl cellulose (TAC), a derivative thereof, and/or a combination thereof.

The composition may be, for example, applied using a solution process such as spin coating, slit coating, and/or inkjet coating, and may control a thickness considering a refractive index of the film.

The applied composition may be, for example, dried at a temperature that is greater than or equal to the boiling point of the solvent.

Hereinafter, an optical film formed using the composition is described referring to the drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 is a cross-sectional view showing an optical film according to an embodiment.

Referring to FIG. 1, an optical film 100 according to an embodiment includes a substrate 110, an alignment layer 115, and a liquid crystal layer 120.

The substrate 110 may include, for example, a glass substrate, a metal substrate, a semiconductor substrate, or a polymer substrate. The polymer substrate may be, for example, a substrate made of polyethylene terephthalate (PET), polyvinyl alcohol (PVA), polycarbonate (PC), triacetyl cellulose (TAC), a derivative thereof, and/or a combination thereof, but is not limited thereto. When the optical film 100 includes another lower layer in addition to the substrate, the substrate 100 may be the lower layer. The substrate 110 may be omitted as needed.

The alignment layer 115 may impart a pretilt angle to the post-described liquid crystals and thus control alignment of the liquid crystals on the substrate 110. The alignment layer 115, for example, may be formed of polyamic acid, polyimide, or a combination thereof. The surface of the alignment layer 115 may have a plurality of grooves formed through a physical treatment such as rubbing or a photo-treatment such as photo-alignment.

The liquid crystal layer 120 may include at least one kind of a liquid crystal 120a and polysiloxane.

The liquid crystal 120a may have a rod shape extending in one direction, and may be, for example, a monomer, an oligomer, and/or a polymer. The liquid crystal 120a may be a reactive mesogenic liquid crystal, and may include, for example, at least one mesogenic moiety and at least one polymerizable functional group. The reactive mesogen liquid crystal may include at least one of, for example, a rod-shaped aromatic derivative having at least one reactive cross-linking group, propylene glycol 1-methyl, propylene glycol 2-acetate, and a compound represented by formula $P^1$-$A^1$-$(Z^1$-$A^2)_n$-$P^2$ (wherein $P^1$ and $P^2$ independently include a polymerizable functional group such as acrylate, methacrylate, acryloyl, vinyl, vinyloxy, epoxy, or a combination thereof, $A^1$ and $A^2$ independently include 1,4-phenylene, naphthalene-2,6-diyl group, or a combination thereof, $Z^1$ includes a single bond, —C(=O)O—, —(O=C) O—, or a combination thereof, and n is 0, 1, or 2), but is not limited thereto.

The liquid crystal 120a may include one or more kinds of liquid crystals.

The liquid crystal 120a may include, for example, at least one of a first liquid crystal represented by the following Chemical Formula A, a second liquid crystal represented by the following Chemical Formula B, and a third liquid crystal represented by the following Chemical Formula C.

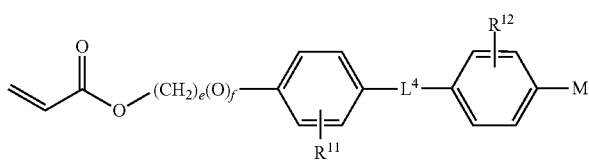

Chemical Formula A

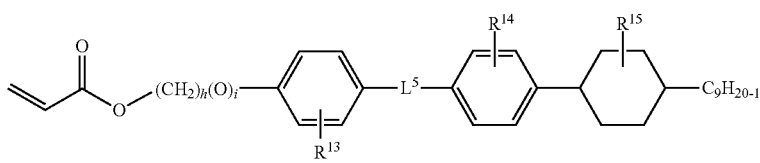

Chemical Formula B

Chemical Formula C

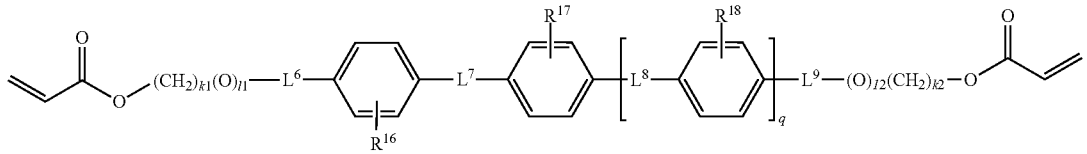

In Chemical Formulae A to C,

M is a cyano group, a cyano-containing group, a hydroxy group, a substituted or unsubstituted carboxyl group, or a combination thereof, $R^{11}$ to $R^{18}$ are each independently hydrogen, a substituted or unsubstituted C1 to C10 alkyl group, a substituted or unsubstituted C1 to C10 alkoxy group, a halogen atom, a halogen-containing group, or a combination thereof, $L^4$ to $L^9$ are each independently a single bond, —C(=O)O—, or —(O=C)O—, e, h, p, $k_1$, and $k_2$ are each independently 1 to 10, and f, i, $I_1$, $I_2$, and q are each independently 0 or 1.

For example, the liquid crystal 120a may include the first liquid crystal and the third liquid crystal, and the liquid crystal may include, for example, about 10 to about 90 wt % of the first liquid crystal and about 10 to about 90 wt % of the third liquid crystal based on the total amount of the liquid crystal 120a.

For example, the liquid crystal 120a may include the second liquid crystal and the third liquid crystal, and may include, for example, about 10 to about 90 wt % of the second liquid crystal and about 10 to about 90 wt % of the third liquid crystal based on the total amount of the liquid crystal 120a.

For example, the liquid crystal 120a may include the first liquid crystal and the second liquid crystal, and the liquid crystal may include, for example, about 10 to about 90 wt % of the first liquid crystal and about 10 to about 90 wt % of the second liquid crystal based on the total amount of the liquid crystal 120a.

For example, the liquid crystal 120a may include the first liquid crystal, the second liquid crystal, and the third liquid crystal, and the liquid crystal may include, for example, about 10 to about 35 wt % of the first liquid crystal, about 10 to about 35 wt % of the second liquid crystal, and about 30 to about 80 wt % of the third liquid crystal based on the total amount of the liquid crystal 120a.

The liquid crystal 120a may have an obliquely tilted optical axis with respect to the surface of the liquid crystal layer 120. Herein, the obliquely tilting with respect to the surface of the liquid crystal layer 120 means that the liquid crystals are not vertically or horizontally aligned in the length direction of the liquid crystal layer 120, and the optical axis of each liquid crystal 120a is obliquely tilted at an angle of greater than 0° to less than 90° with the length direction of the liquid crystal layer 120.

An angle at which the optical axis of the liquid crystal 120a is tilted with a respect to the surface of the liquid crystal layer 120 (hereinafter called 'a tilt angle') may change along the thickness direction of the liquid crystal layer 120. For example, the tilt angle of the liquid crystals 120a may gradually change along the thickness direction of the liquid crystal layer 120.

For example, when the liquid crystal layer 120 has a first side contacting the alignment layer 115 and a second side contacting air, the tilt angle of the liquid crystals 120a may become gradually larger from the first side to the second side.

For example, the tilt angle ($\theta_1$) of the liquid crystals 120a at the first side may be a pretilt angle caused by the alignment layer 115, for example, ranging from greater than about 0° to less than or equal to about 5°. The tilt angle ($\theta_1$) may be, for example, in a range of about 1° to about 5° within the range.

The tilt angle ($\theta_2$) of the liquid crystals 120a at the second side may be a maximum tilt angle, for example, in a range of about 40° to about 70°. The maximum tilt angle may be, for example, in a range of about 40° to about 60°.

The liquid crystal layer 120 may have reverse wavelength dispersion phase delay. The phase delay may be represented by in-plane retardation ($R_e$), and the in-plane retardation ($R_e$) may be represented by equation $R_e=(n_x-n_y)d$. Herein, $n_x$ is a refractive index in a direction having the highest refractive index in a plane of the liquid crystal layer 120 (hereinafter referred to as "a slow axis"), $n_y$ is a refractive index in a direction having a lowest refractive index in a plane of the liquid crystal layer 120 (hereinafter referred to as "a fast axis"), and d is a thickness of the liquid crystal layer 120.

The reverse wavelength dispersion phase delay has higher retardation to light having a long wavelength than the retardation to light having a short wavelength, and in-plane retardation ($R_e$) of the liquid crystal layer 120 for 450 nm, 550 nm, and 650 nm wavelengths may, for example, satisfy the following Relationship 1.

$R_e(450\ nm)<R_e(550\ nm)\leq R_e(650\ nm)$     Relationship Equation 1

In Relationship Equation 1, $R_e$ (450 nm) is in-plane retardation for incident light of a 450 nm wavelength, $R_e$ (550 nm) is in-plane retardation for incident light of a 550 nm wavelength, and $R_e$ (650 nm) is in-plane retardation for incident light of a 650 nm wavelength.

The wavelength dispersion of the liquid crystal layer 120 may satisfy the following Relationship Equation 2.

$0.7\leq R_e(450\ nm)/R_e(550\ nm)<1.0$     Relationship Equation 2

For example, the wavelength dispersion of the liquid crystal layer 150 may satisfy the following Relationship Equation 2a.

$0.72\leq R_e(450\ nm)/R_e(550\ nm)\leq 0.92$     Relationship Equation 2a

For example, the wavelength dispersion of the liquid crystal layer 120 may satisfy the following Relationship Equation 2b.

$0.80\leq R_e(450\ nm)/R_e(550\ nm)\leq 0.85$     Relationship Equation 2b

The liquid crystal layer 120 includes a plurality of liquid crystals 120a having tilted optical axes, and the tilt angle of the liquid crystals 120a is changed along the thickness direction of the liquid crystal layer 120. Accordingly a circularly-polarized light effect is equally realized in all directions and external light is effectively prevented from reflection at the side as well as the front, resulting in improvement of side visibility.

The polysiloxane may be represented by the following Chemical Formula 1.

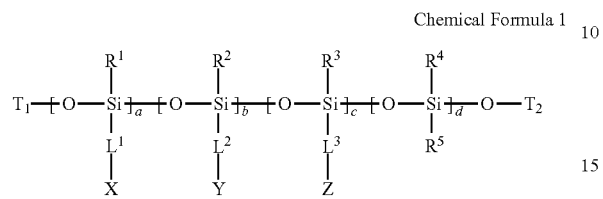

Chemical Formula 1

In Chemical Formula 1, $R^1$ to $R^5$ are each independently hydrogen, a substituted or unsubstituted C1 to C10 alkyl group, a substituted or unsubstituted C6 to C30 aryl group, or a combination thereof, $R^4$ and $R^5$ are each independently present or are linked to each other to form a ring, $L^1$ to $L^3$ are each independently a single bond, a substituted or unsubstituted C1 to C10 alkylene group, a substituted or unsubstituted C2 to C10 alkenylene group, a substituted or unsubstituted C2 to C10 alkynylene group, or a combination thereof, X is a substituted or unsubstituted C3 to C20 alkyl group, Y is $-(OC_pH_{2p})_kOCH_3$, wherein p is 1 to 5 and k is 0 to 10, Z is a substituted or unsubstituted C6 to C30 aryl group, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, $0 \le a < 1$, $0 \le b \le 0.5$, $0 \le c \le 0.5$, $0 \le d \le 0.5$, provided that a+b+c+d=1.

For example, in the above Chemical Formula 1, $R^1$ to $R^3$ may each independently be hydrogen or a substituted or unsubstituted C1 to C10 alkyl group, and for example $R^1$ to $R^3$ may each independently be a methyl group.

For example, in the above Chemical Formula 1, $R^4$ and $R^5$ may each independently be a substituted or unsubstituted C6 to C30 aryl group, and for example $R^4$ and $R^5$ may be linked to each other to form a ring.

For example, in the above Chemical Formula 1, $L^1$ to $L^3$ may each independently be a single bond, a substituted or unsubstituted C1 to C5 alkylene group, a substituted or unsubstituted C2 to C5 alkenylene group, or a substituted or unsubstituted C2 to C5 alkynylene group.

For example, in the above Chemical Formula 1, X may be a substituted or unsubstituted C3 to C10 alkyl group, Y may be $-(OC_2H_4)_kOCH_3$, and Z may be a substituted or unsubstituted phenyl group, a substituted or unsubstituted biphenyl group, or a substituted or unsubstituted naphthyl group.

The polysiloxane may be, for example, represented by one of the following Chemical Formulae 1a to 1c.

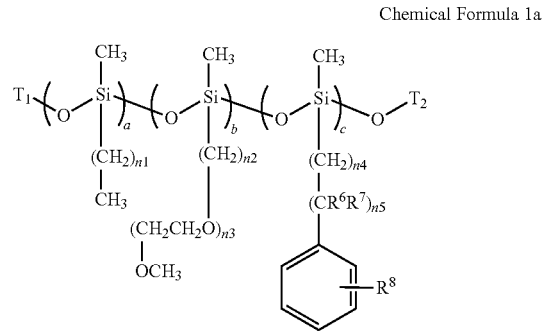

Chemical Formula 1a

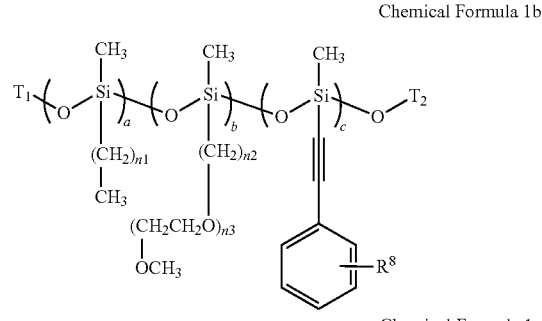

Chemical Formula 1b

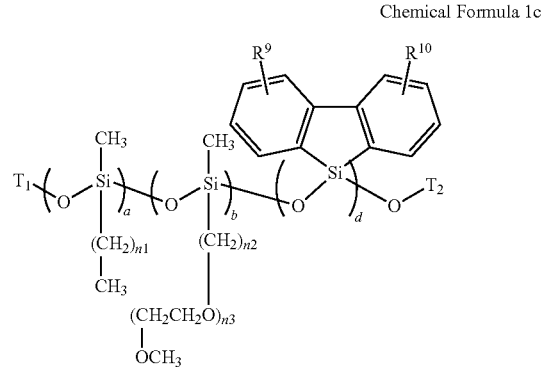

Chemical Formula 1c

In Chemical Formulae 1a to 1c, $R^6$ to $R^{10}$ are each independently hydrogen, a substituted or unsubstituted C1 to C10 alkyl group, a substituted or unsubstituted C6 to C30 aryl group, or a combination thereof, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, n1 to n5 are each independently 0 to 10, $0 \le a < 1$, $0 \le b \le 0.5$, $0 \le c \le 0.5$, $0 \le d \le 0.5$, provided that a+b+c+d=1.

The polysiloxane may have a weight average molecular weight of about 1,000 Dalton to about 50,000 Dalton. Within the range, the polysiloxane may have a weight average molecular weight of about 2,000 Dalton to about 30,000 Dalton or about 3,000 Dalton to about 20,000 Dalton.

The polysiloxane may be mainly disposed on the surface of the liquid crystal layer 120, that is, on the second side of the liquid crystal layer 120 contacting air, and may control alignment properties and/or a refractive index of the liquid crystals 120a that are adjacent to the polysiloxane by two or more side chain groups bound to a siloxane backbone. Accordingly, the liquid crystals 120a that are adjacent to the polysiloxane may be easily aligned at a maximum tilt angle ($\theta_2$) of, for example, about 40° to about 70°, and the tilt angle of the liquid crystal 120a may gradually change from the second side of the liquid crystal layer 120 positioned at the interface with air to the first side of the liquid crystal layer 120 positioned on the substrate 110.

The liquid crystal layer 120 may have a refractive index satisfying the following Relationship Equation 1.

$$n_x > n_z > n_y$$ Relationship Equation 1

In Relationship Equation 1, $n_x$ is a refractive index of the liquid crystal layer at a slow axis, $n_y$ is a refractive index of the liquid crystal layer at a fast axis, and $n_z$ is a refractive index in a direction perpendicular to $n_x$ and $n_y$.

The liquid crystal layer 120 may have a refractive index satisfying the following Relationship Equation 2.

$$0 < n_x - n_z / n_x - n_y < 1$$ Relationship Equation 2

The liquid crystal layer 120 may have a refractive index satisfying the following Relationship Equation 2a.

$$0.3 \leq n_x - n_z / n_x - n_y < 0.65$$ Relationship Equation 2

The liquid crystal layer 120 may equally realize circularly-polarized light effect in all directions by satisfying the refractive index conditions, and equally compensate display characteristics at the side as well as the front.

The optical film 100 may form an antireflective film with a polarizer that may have an external light reflection function.

Figure 2:
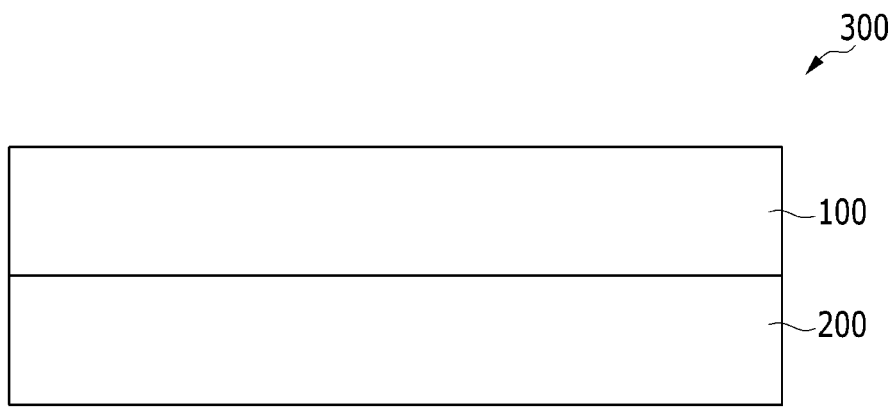
FIG. 2 is a cross-sectional view of an antireflective film according to an embodiment.

FIG. 2 is a schematic cross-sectional view showing an antireflective film according to an embodiment.

Referring to FIG. 2, an antireflective film 300 according to an embodiment includes a polarizer 200 and an optical film 100.

The polarizer 200 may be disposed on the side where the light enters, and may be a linear polarizer changing the polarization of incident light into linear polarization.

The polarizer 200 may be made of, for example, elongated polyvinyl alcohol (PVA) according to a method of, for example, stretching a polyvinyl alcohol film, adsorbing iodine or a dichroic dye thereto, and borating and washing the same.

The polarizer 200 may be a polarizing film prepared, for example, by mixing a polymer and a dichroic dye and melt-blending the polymer with the dichroic dye at a temperature above the melting point of the polymer to form a sheet.

The optical film 100 is the same as described above.

An adhesion layer (not shown) may be further disposed between the polarizer 200 and optical film 100. The adhesion layer may effectively adhere between the polarizer 200 and the optical film 100, and may be, for example, made of a pressure sensitive adhesive.

The antireflective film 300 may further include a protective layer (not shown) on the polarizer 200. The protective layer may be provided for further reinforcing the functionality or improving the durability of the antireflective film 300, or for reducing reflection or glare, and for example, may be a triacetyl cellulose (TAC) film, but is not limited thereto.

The antireflective film 300 may further include a correction layer (not shown) on the optical film 100. The correction layer may be, for example, a color shift resistant layer, but is not limited thereto.

The antireflective film 300 may further include a light blocking layer (not shown) extended along the edge. The light blocking layer may be formed as a strip along the circumference of the antireflective film 300. The light blocking layer may include an opaque material, for example, a black material. For example, the light blocking layer may be made of a black ink.

The antireflective film 300 may be stacked with the optical film 100 and the polarizer 200 by a roll-to-roll method, without limitation.

Figure 3:
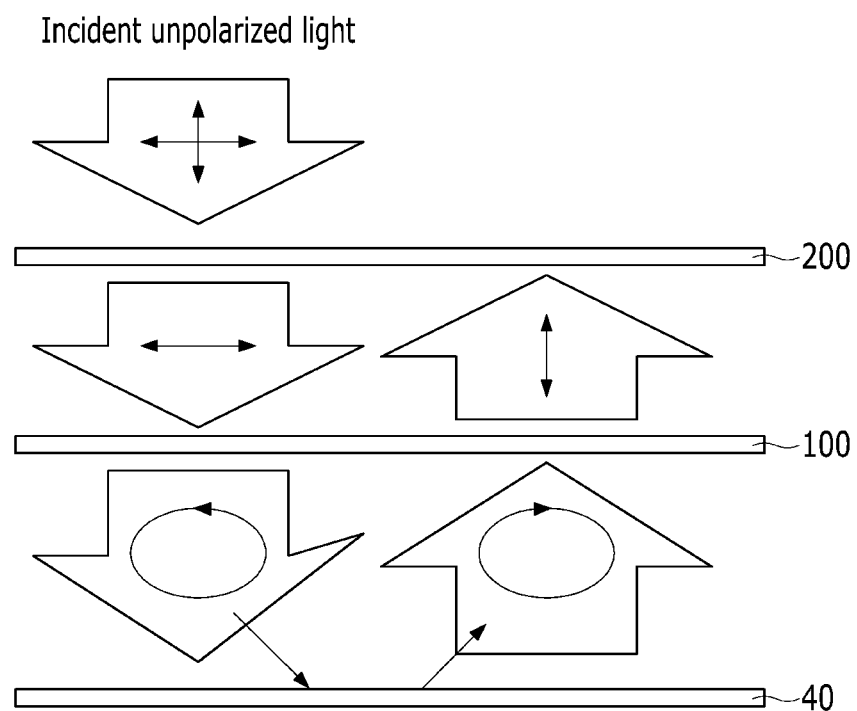
FIG. 3 is a schematic view showing the anti-reflection principle of an antireflective film according to an embodiment.

FIG. 3 is a schematic view showing the external light anti-reflection principle of an antireflective film according to an embodiment.

Referring to FIG. 3, while the incident unpolarized light having entered (hereinafter referred to as "external light") from the outside is passed through the polarizer 200, and the polarized light is changed into circularly polarized light by passing through the optical film 100, only a first polarized perpendicular component, which is one polarized perpendicular component of two polarized perpendicular components, is transmitted. While the circularly polarized light is reflected in a display panel 40 including a substrate, an electrode, and so on, and changes the circular polarization direction, and the circularly polarized light is passed through the optical film 100 again, only a second polarized perpendicular component, which is the other polarized perpendicular component of the two polarized perpendicular components, may be transmitted. As the second polarized perpendicular component is not passed through the polarizer 200, and light does not exit to the outside, effects of preventing the external light reflection may be provided.

Figure 4:
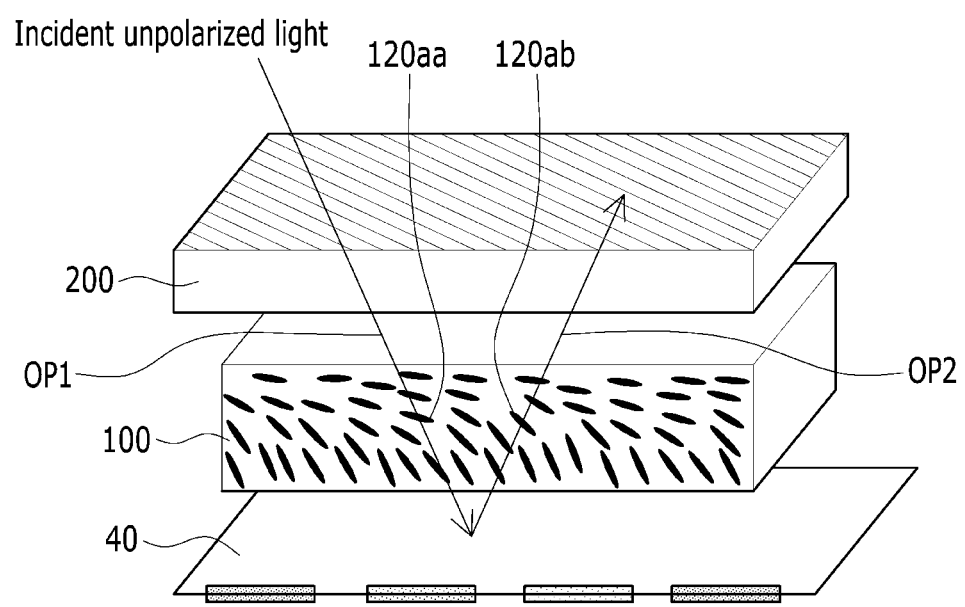
FIG. 4 is a schematic view showing a viewing angle improvement principle of an antireflective film according to an embodiment.

FIG. 4 is a schematic view showing a viewing angle improvement principle of an antireflective film according to an embodiment.

Referring to FIG. 4, external light goes through a first optical path OP1 in which the light passes through the polarizer 200 and the optical film 100 and reaches the display panel 40 and a second optical path OP2 in which the light is reflected from the display panel 40 and repassed through the optical film 100, and the light has a polarization direction that is changed through the first and second optical paths OP1 and OP2 and does not pass through the polarizer 200, showing an external light anti-reflection effect.

Herein, the first and second optical paths OP1 and OP2 may substantially form a mirror image as a reference of the display panel 40. Accordingly, the optical film 100 includes liquid crystals that are obliquely tilted and aligned in one direction, but when external light sequentially passes the first optical path OP1 and the second optical path OP2 having opposite directions from each other, a phase difference may be adjusted by summing the slope alignment of liquid crystals 120aa in the first optical path OP1 and the slope alignment of liquid crystals 120ab in the second optical path OP2. Accordingly, an anti-reflection effect may be substantially equivalent in all directions, and a color shift due to reflection of external light at the side as well as the front side may be effectively prevented, resulting in improved side visibility.

The optical film 100 and the antireflective film 300 may be applied to various display devices.

A display device according to an embodiment includes a display panel and a film disposed on the display panel. The display panel may be a liquid crystal panel or an organic light emitting panel, but is not limited thereto. The film may be the optical film 100 or the antireflective film 300.

Hereinafter, for an example of a display device, an organic light emitting diode device is described.

Hereinafter, referring to drawings, an organic light emitting diode device including the antireflective film 300 is described.

Figure 5:
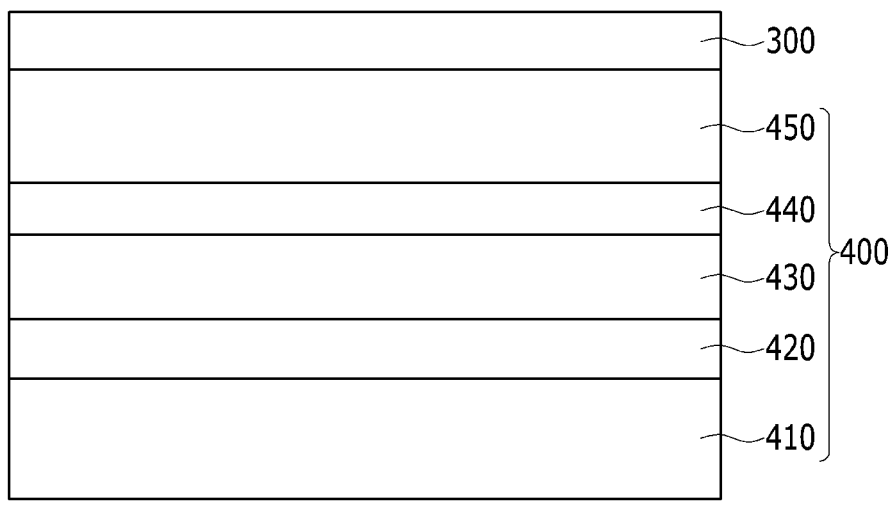
FIG. 5 is a cross-sectional view schematically showing an organic light emitting device according to an embodiment.

FIG. 5 is a cross-sectional view schematically showing an organic light emitting device according to an embodiment.

Referring to FIG. 5, the organic light emitting device according to an embodiment includes an organic light emitting panel 400 and an antireflective film 300 positioned on the organic light emitting panel 400.

The organic light emitting panel 400 includes a base substrate 410, a lower electrode 420, an organic emission layer 430, an upper electrode 440, and an encapsulation substrate 450.

The base substrate 410 may be made of glass or plastic.

One of the lower electrode 420 and the upper electrode 440 may be an anode, and the other one may be a cathode. The anode is an electrode into which holes are injected and may be made of a conductive material having a high work function, and the cathode is an electrode into which electrons are injected and may be made of a conductive material having a low work function. At least one of the lower electrode 420 and the upper electrode 440 may be made of a transparent conductive material from which emitted light exits outside, for example ITO or IZO.

The organic emission layer 430 includes an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer may include a hole transporting layer, a hole injecting layer, an electron injecting layer, and an electron transporting layer in order to balance electrons and holes, but is not limited thereto.

The encapsulation substrate 450 may be made of glass, metal, or a polymer, and may seal the lower electrode 420, the organic emission layer 430, and the upper electrode 440 to prevent moisture and/or oxygen inflow from the outside.

The antireflective film 300 may be disposed on the side emitting light. For example, in the case of a bottom emission structure emitting light at the side of the base substrate 410, the antireflective film 300 may be disposed on the exterior side of the base substrate 410, while on the other hand, in the case of a top emission structure emitting light at the side of the encapsulation substrate 450, the antireflective film 300 may be disposed on the exterior side of the encapsulation substrate 450.

The antireflective film 300 may prevent external light from being reflected by a metal such as an electrode of the organic light emitting panel 400 and emitting outside of the organic light emitting device. Thus, the antireflective film 300 may improve display characteristics of the organic light emitting device.

In addition, the antireflective film 300 may not only show a substantially equivalent anti-reflection effect in all directions, but may also effectively prevent a color shift due to reflection of external light at the side as well as the front as described above, and thus improve side visibility.

Hereinafter, a liquid crystal display (LCD) is described as one example of the display device.

Hereinafter, referring to drawings, a liquid crystal display (LCD) including the optical film 100 is described.

Figure 6:
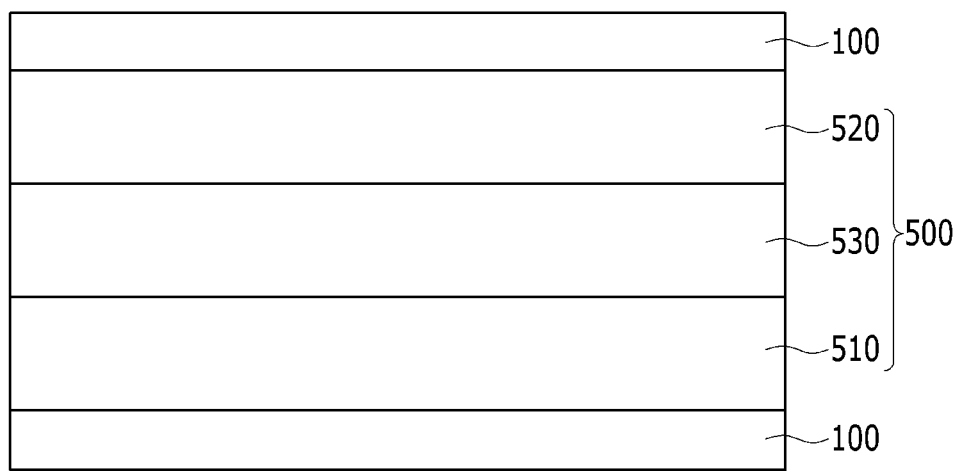
FIG. 6 is a schematic cross-sectional view schematically showing a liquid crystal display (LCD) device according to an embodiment.

FIG. 6 is a schematic cross-sectional view showing a liquid crystal display (LCD) device according to an embodiment.

Referring to FIG. 6, the liquid crystal display (LCD) according to an embodiment includes a liquid crystal panel 500, and an optical film 100 positioned on one side or both sides of the liquid crystal panel 500.

The liquid crystal panel 500 may be a twist nematic (TN) mode panel, a homeotropic patterned vertical alignment (PVA) mode panel, an in-plane switching (IPS) mode panel, an optically compensated bend (OCB) mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same, and the second display panel 520 may include, for example, a color filter (not shown) formed on a substrate (not shown) and a second electric field generating electrode (not shown). However, it is not limited thereto, and the color filter may be included in the first display panel 510, while the first electric field generating electrode and the second electric field generating electrode may be disposed on the first display panel 510 together therewith.

The liquid crystal layer 530 may include a plurality of liquid crystals. The liquid crystals may have positive or negative dielectric anisotropy. In the case of the liquid crystals having positive dielectric anisotropy, the major axes thereof may be aligned substantially parallel to the surface of the first display panel 510 and the second display panel 520 when an electric field is not applied, and the major axes may be aligned substantially perpendicular to the surface of the first display panel 510 and second display panel 520 when an electric field is applied. On the other hand, in the case of the liquid crystals having negative dielectric anisotropy, the major axes may be aligned substantially perpendicular to the surface of the first display panel 510 and the second display panel 520 when an electric field is not applied, and the major axes may be aligned substantially parallel to the surface of the first display panel 510 and the second display panel 520 when an electric field is applied.

The optical film 100 is disposed on the outside of the liquid crystal panel 500. Although the optical film 100 is shown to be provided on both the lower part and the upper part of the liquid crystal panel 500 in the drawing, it is not limited thereto, and the optical film 100 may be formed on only one of the lower part and the upper part of the liquid crystal panel 500.

Hereinafter, the present disclosure is illustrated in more detail with reference to examples. However, these examples are exemplary, and the present disclosure is not limited thereto.

Preparation of Composition

Preparation Example 1

A composition is prepared by mixing 1 gram (g) of a liquid crystal mixture including a first liquid crystal represented by the following Chemical Formula A-1 (Merck & Co. Ltd.), a second liquid crystal represented by the following Chemical Formula B-1 (Merck & Co. Ltd.), and a third liquid crystal represented by the following Chemical Formula C-1 (Merck & Co. Ltd.), 0.01 g of polysiloxane (MW=12,900) represented by the following Chemical Formula 1aa, 0.03 g of a photoinitiator (Irgacure 907, Ciba Specialty Chemicals Inc.), 0.01 g of a sensitizer (DETX, Sigma-Aldrich Co., Ltd.), and 3.95 g of a mixed solvent of toluene and cyclohexanone (7:3 of wt/wt), and then agitating the mixture on a 45° C. hot plate. Herein, the liquid crystal mixture includes 20.56 wt % of a first liquid crystal, 32.36 wt % of a second liquid crystal, and 47.08 wt % of a third liquid crystal.

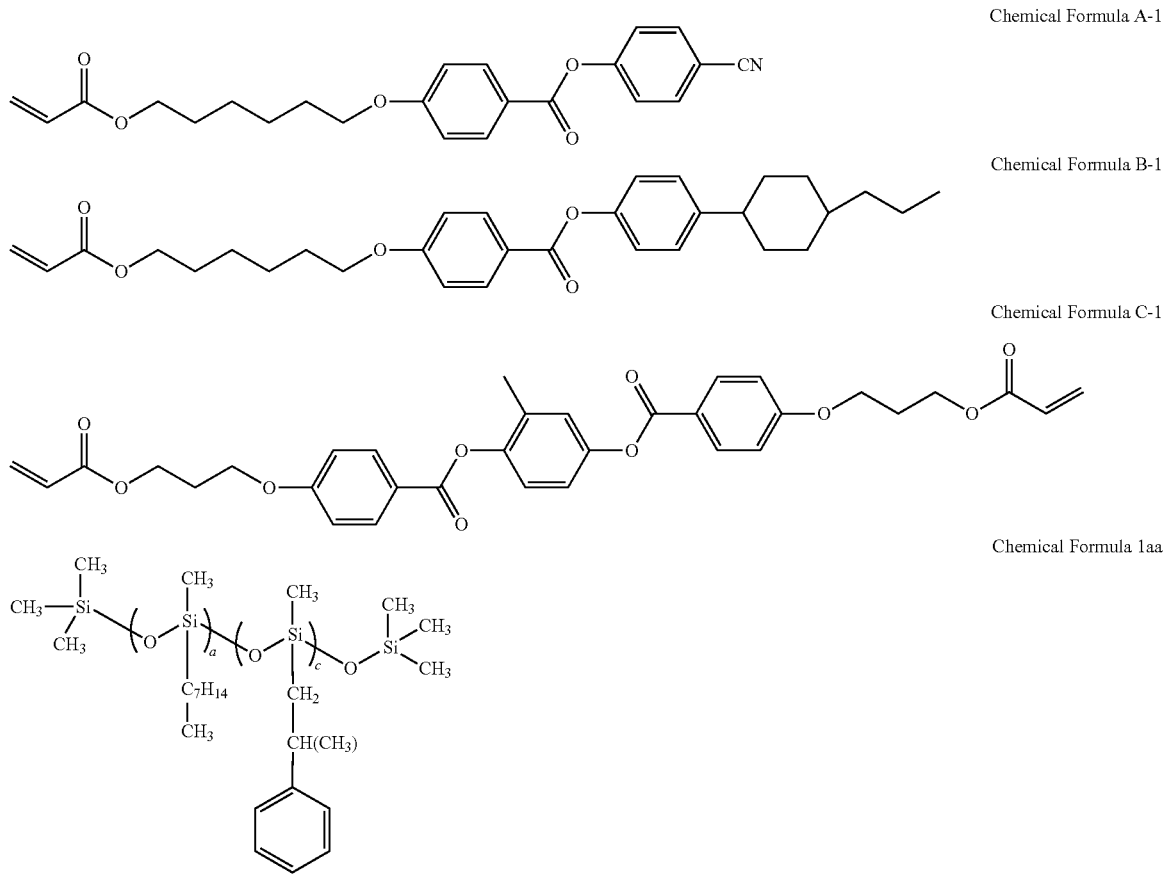

Chemical Formula A-1

Chemical Formula B-1

Chemical Formula C-1

Chemical Formula 1aa

Preparation Example 2

A composition is prepared by mixing 1 g of the liquid crystal mixture, 0.02 g of polysiloxane represented by the above Chemical Formula 1aa (MW=12,900), 0.03 g of a photoinitiator (Irgacure 907, CIBA Specialty Chemicals Inc.), 0.01 g of a sensitizer (DETX, Sigma-Aldrich Co., Ltd.), and 3.94 g of a mixed solvent of toluene and cyclohexanone (7:3 of wt/wt), and agitating the mixture on a 45° C. hot plate for 1 hour.

Preparation Example 3

A composition is prepared by mixing 1 g of the liquid crystal mixture, 0.03 g of polysiloxane represented by the above Chemical Formula 1aa (MW=12,900), 0.03 g of a photoinitiator (Irgacure 907, CIBA Specialty Chemicals Inc.), 0.01 g of a sensitizer (DETX, Sigma-Aldrich Co., Ltd.), and 3.93 g of a mixed solvent of toluene and cyclohexanone (7:3 of wt/wt) and agitating the mixture on a 45° C. hot plate for one hour.

Preparation Example 4

A composition is prepared by mixing 1 g of the liquid crystal mixture, 0.021 g of polysiloxane represented by the above Chemical Formula 1aa (MW=12,900), 0.03 g of a photoinitiator (Irgacure 907, CIBA Specialty Chemicals Inc.), 0.01 g of a sensitizer (DETX, Sigma-Aldrich Co., Ltd.), and 3.939 g of a mixed solvent of toluene and cyclohexanone (7:3 of wt/wt), and then agitating the mixture on a 45° C. hot plate for 1 hour.

Comparative Preparation Example 1

A composition is prepared by mixing 1 g of the liquid crystal mixture, 0.03 g of a photoinitiator (Irgacure 907, CIBA Specialty Chemicals Inc.), 0.01 g of a sensitizer (DETX, Sigma-Aldrich Co., Ltd.), and 3.96 g of a mixed solvent of toluene and cyclohexanone (7:3 of wt/wt), and agitating the mixture on a 45° C. hot plate for 1 hour.

Comparative Preparation Example 2

A composition is prepared by mixing 1 g of the liquid crystal mixture, 0.042 g of polysiloxane (RAD 2011, Tego Inc., MW=6142), 0.03 g of a photoinitiator (Irgacure 907, CIBA Specialty Chemicals Inc.), 0.01 g of a sensitizer (DETX, Sigma-Aldrich Co., Ltd.), and 3.918 g a mixed solvent of toluene and cyclohexanone (7:3 of wt/wt), and agitating the mixture on a 45° C. hot plate for one hour.

Comparative Preparation Example 3

A composition is prepared by mixing 1 g of the liquid crystal mixture, 0.042 g of polysiloxane (RAD 2100, TEGO Inc., MW=5731), 0.03 g of a photoinitiator (Irgacure 907, CIBA Specialty Chemicals Inc.), 0.01 g of a sensitizer (DETX, Sigma-Aldrich Co., Ltd.), and 3.918 g of a mixed solvent of toluene and cyclohexanone (7:3 of wt/wt), and agitating the mixture on a 45° C. hot plate for 1 hour.

Comparative Preparation Example 4

A composition is prepared by mixing 1 g of the liquid crystal mixture, 0.042 g of polysiloxane (BYK-378, BYK-Chemie, MW=5176), 0.03 g of a photoinitiator (Irgacure 907, CIBA Specialty Chemicals Inc.), 0.01 g of a sensitizer (DETX, Sigma-Aldrich Co., Ltd.), and 3.918 g of a mixed solvent of toluene and cyclohexanone (7:3 of wt/wt), and agitating the mixture on a 45° C. hot plate for 1 hour.

Manufacture of Film

Example 1

A polyimide solution (SE-7492K, Nissan Chemical Industries Ltd.) is applied on a 1 mm-thick glass substrate, spin-coated at 1,500 revolutions per minute (rpm) for 15 seconds and at 3,000 rpm for 30 seconds, and dried at 80° C. for 30 minutes. Subsequently, the dried substrate is baked at 200° C. for 1 hour and rubbed on the surface to form a polyimide alignment layer. The composition according to Preparation Example 1 is spin-coated on the alignment layer at 1,500 rpm for 20 seconds. Subsequently, the substrate is dried to form a liquid crystal layer. Then, ultraviolet (UV) rays are radiated on the liquid crystal layer with a light amount of 1,000 milliJoules per square centimeter (mJ/cm$^2$) to cure the liquid crystal layer into a film.

Example 2

A film is manufactured according to the same method as Example 1, except for using the composition of Preparation Example 2 instead of the composition of Preparation Example 1.

Example 3

A film is manufactured according to the same method as Example 1, except for using the composition of Preparation Example 3 instead of the composition of Preparation Example 1.

Example 4

A film is manufactured according to the same method as Example 1, except for using the composition of Preparation Example 4 instead of the composition of Preparation Example 1.

Comparative Example 1

A film is manufactured according to the same method as Example 1, except for using the composition of Comparative Preparation Example 1 instead of the composition of Preparation Example 1.

Comparative Example 2

A film is manufactured according to the same method as Example 1, except for using the composition of Comparative Preparation Example 2 instead of the composition of Preparation Example 1.

Comparative Example 3

A film is manufactured according to the same method as Example 1, except for using the composition of Comparative Preparation Example 3 instead of the composition of Preparation Example 1.

Comparative Example 4

A film is manufactured according to the same method as Example 1, except for using the composition of Comparative Preparation Example 4 instead of the composition of Preparation Example 1.

Evaluation 1

Polysiloxane distribution profiles of the films according to Examples 2 and 3 are examined.

The polysiloxane distribution profiles are measured through X-ray photoelectron spectroscopy (XPS) (Ar-ion 1 kv).

Figure 7:
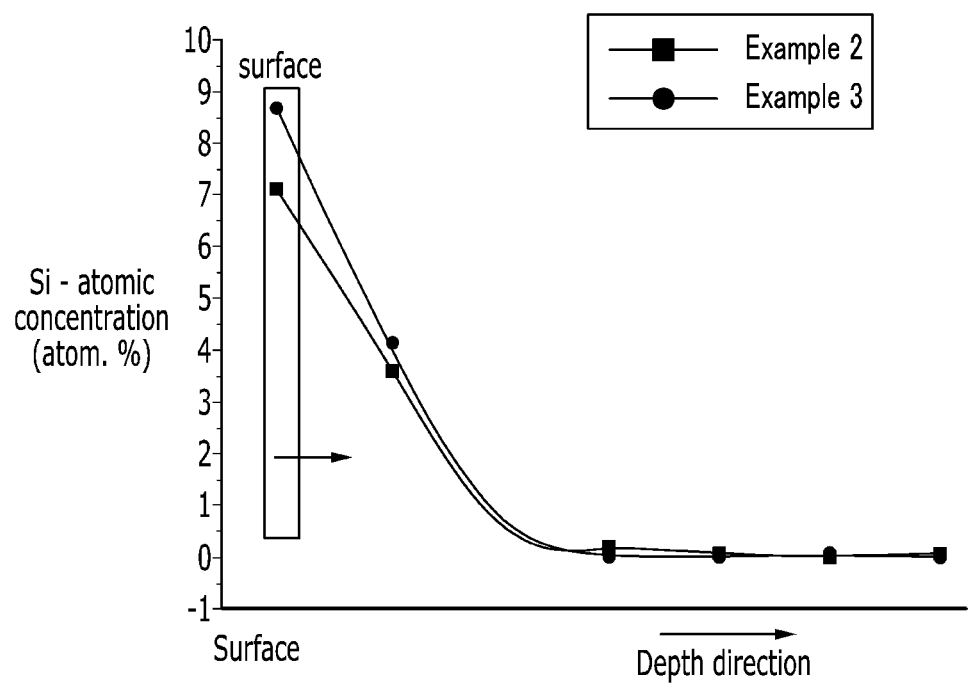
FIG. 7 is a graph of Si-atomic concentration (atomic %, atom. %) versus film depth showing a distribution profile of polysiloxane depending on a depth of the films according to Examples 2 and 3.

The results are provided in FIG. 7.

FIG. 7 is a graph showing the polysiloxane distribution profiles of the films according to Examples 2 and 3 depending on a depth.

Referring to FIG. 7, most of polysiloxane is distributed on the surface of the films according to Examples 2 and 3.

Evaluation 2

Refractive index and retardation of each film according to Examples 1 to 3 and Comparative Example 1 are evaluated.

The refractive index and the retardation are measured by attaching each film specimen having a size of 5×5 square centimeters (cm$^2$) to AxoScan™ equipment (Axometrics, Inc.), and rotating the film from 10° to 70° of a viewing angle. Herein, the measurements are performed at a wavelength of 550 nm, repeated 10 times, and then averaged.

Figure 8:
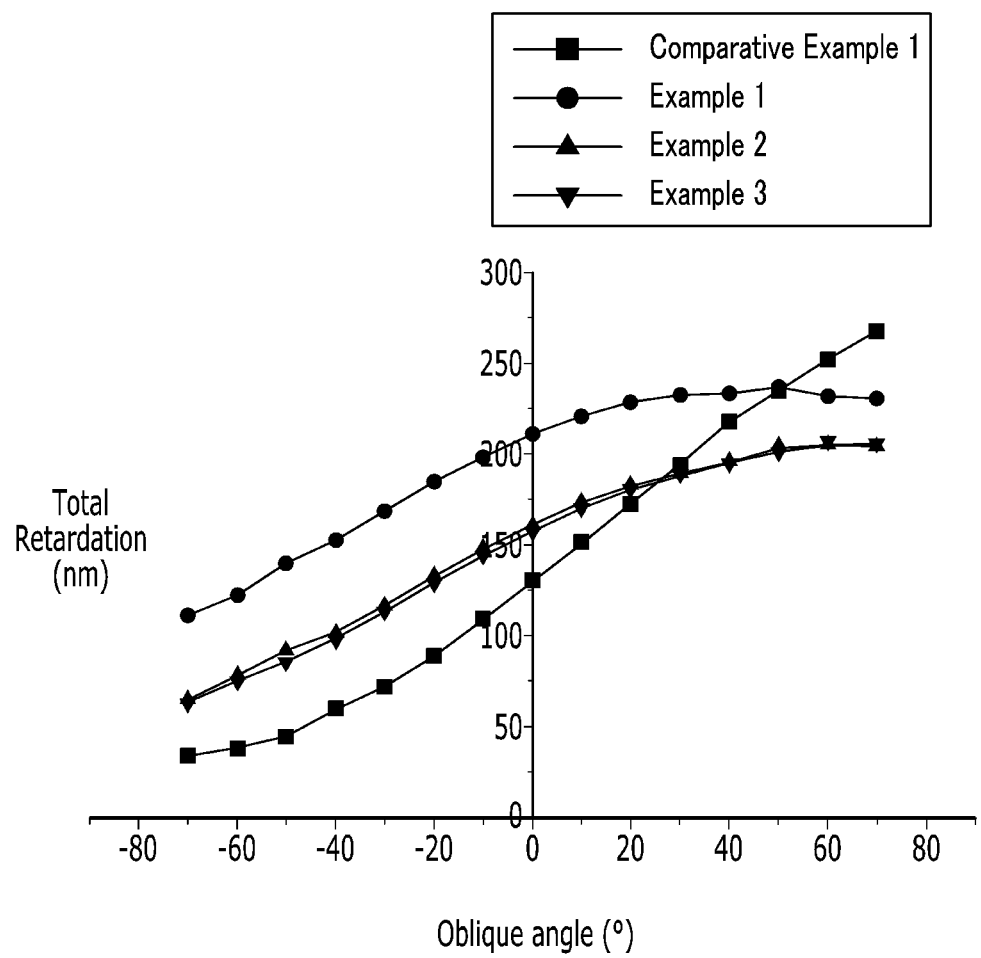
FIG. 8 is a graph of total retardation (nanometers, nm) versus oblique angle (degrees, °) illustrating tilt angles and phase difference of the films according to Examples 1 to 3 and Comparative Example 1.

The results are provided in Table 1 and FIG. 8.

FIG. 8 is a graph showing tilt angles and retardations of the films according to Examples 1 to 3 and Comparative Example 1.

TABLE 1

| | $n_x$ | $n_z$ | $n_y$ | $n_x - n_z/n_x - n_y$ |
|---|---|---|---|---|
| Example 1 | 1.767681 | 1.685525 | 1.588948 | 0.5116 |
| Example 2 | 1.752229 | 1.679417 | 1.611027 | 0.6354 |
| Example 3 | 1.767681 | 1.685525 | 1.588948 | 0.5116 |
| Comparative Example 1 | 1.676545 | 1.672953 | 1.673 | 0.6531 |

Referring to Table 1, the films according to Examples 1 to 3 satisfy $n_x > n_z > n_y$ and $n_x - n_z / n_x - n_y < 0.65$.

In addition, referring to FIG. 8, the films according to Examples 1 to 3 have an obliquely tilt angle (about 40° to 70°) of liquid crystals showing an almost constant retardation, while Comparative Example 1 has no section having a constant retardation but has a continuously increasing retardation. Accordingly, in the films of Examples 1 to 3, a maximum tilt angle of the liquid crystals turns out to be controlled in a range of about 40° to 70°.

Evaluation 3

Refractive index and retardation of the films according to Example 4 and Comparative Examples 2 to 4 are evaluated.

These refractive index and retardation are measured in the same method as used in Evaluation 2.

Figure 9:
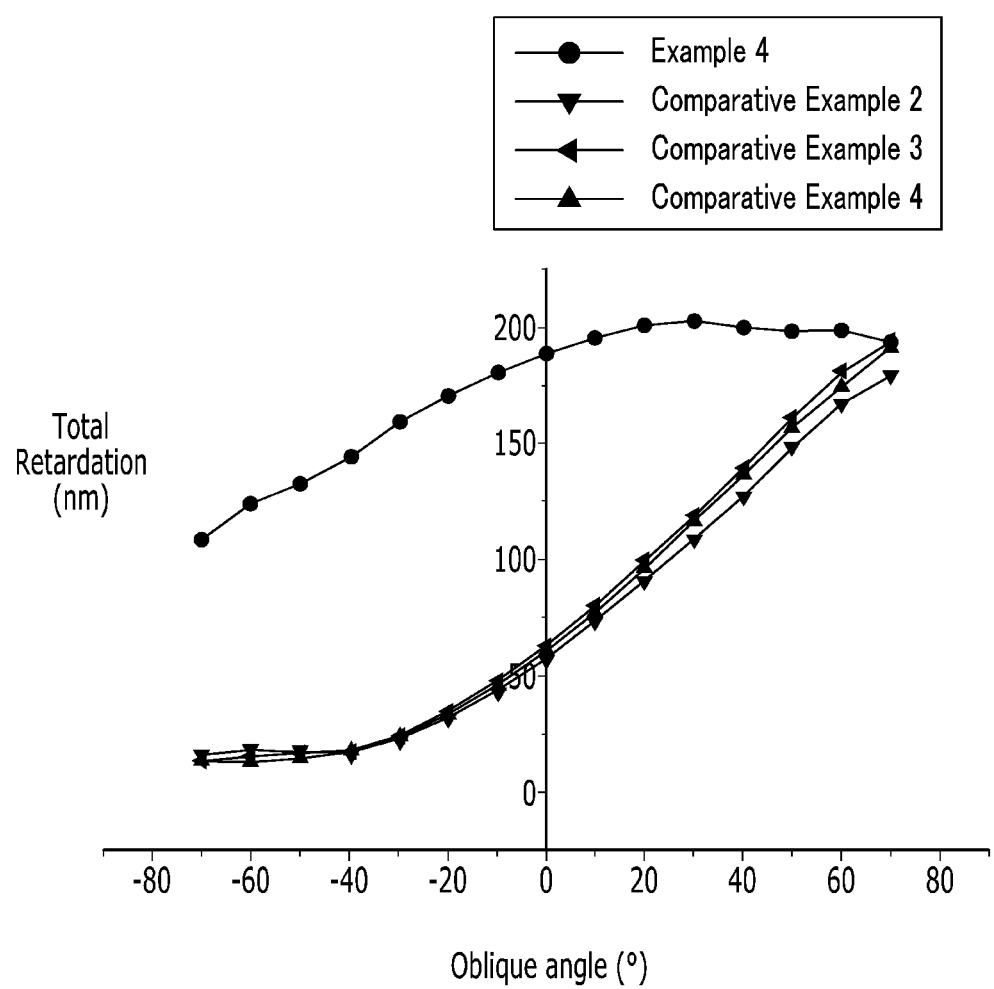
FIG. 9 is a graph of total retardation (nanometers, nm) versus oblique angle (degrees, °) illustrating tilt angles and phase difference of the films according to Example 4 and Comparative Examples 2 to 4.

The results are provided in Table 2 and FIG. 9.

FIG. 9 is a graph showing obliquely tilt angles and retardations of the films according to Example 4 and Comparative Examples 2 to 4.

TABLE 2

|  | $n_x$ | $n_z$ | $n_y$ | $n_x - n_z/n_x - n_y$ |
|---|---|---|---|---|
| Example 4 | 1.7121 | 1.6893 | 1.64284 | 0.5347 |
| Comparative Example 2 | 1.7615 | 1.6368 | 1.6457 | 0.7609 |
| Comparative Example 3 | 1.7893 | 1.6216 | 1.6296 | 1.0373 |
| Comparative Example 4 | 1.7616 | 1.6346 | 1.6462 | 0.9791 |

Referring to Table 2, the film of Example 4 satisfies $n_x > n_z > n_y$ and $n_x - n_z / n_x - n_y < 0.65$.

In addition, referring to FIG. 9, the film of Example 4 has an obliquely tilt angle (about 40° to 70°) of liquid crystals showing an almost constant retardation, while the films of Comparative Examples 2 to 4 have no section showing a constant retardation but have a continuously increasing retardation. Accordingly, in the film of Example 4, a maximum tilt angle of the liquid crystals turns out to be controlled in a range of about 40° to 70°.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical film comprising a liquid crystal layer comprising:

a liquid crystal and a polysiloxane represented by Chemical Formula 1a:

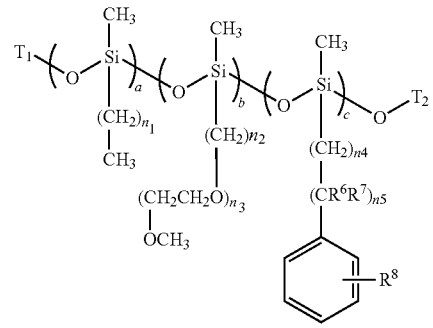

Chemical Formula 1a

Wherein, in Chemical Formula 1a, $R^6$ to $R^8$ are each independently hydrogen, a substituted or unsubstituted C1 to C10 alkyl group, a substituted or unsubstituted C6 to C30 aryl group, or a combination thereof, $T^1$ and $T^2$ are each independently a substituted or unsubstituted C1 to C20 alkyl group, a substituted or unsubstituted C3 to C20 silyl group, a substituted or unsubstituted C6 to C30 aryl group, a substituted or unsubstituted C2 to C20 alkenyl group, a substituted or unsubstituted C2 to C20 alkynyl group, or a combination thereof, n1 is 2 to 10, n2 to n5 are each independently 0 to 10, $0 \leq a < 1$, $0 \leq b \leq 0.5$, $0 \leq c \leq 0.5$, provided that $a+b+c=1$, wherein the liquid crystal layer satisfies Relationship Equation 2a:

$$0.3 \leq n_x - n_z / n_x - n_y < 0.65 \qquad \text{Relationship Equation 2a}$$

wherein, in Relationship Equation 2a, $n_x$ is a refractive index of the liquid crystal layer at a slow axis, $n_y$ is a refractive index of the liquid crystal layer at a fast axis, and $n_z$ is a refractive index in a direction perpendicular to $n_x$ and $n_y$, wherein the liquid crystal has a rod shape extending in one direction, and wherein the liquid crystal is a reactive mesogenic liquid crystal, a thermosetting liquid crystal, or a photocurable liquid crystal.

2. The optical film of claim 1, wherein the liquid crystal having a rod shape extending in one direction has positive or negative birefringence values (Δn), wherein the birefringence (Δn) is a difference between the refractive index ($n_o$) of light propagating in the direction perpendicular to an optical axis from the refractive index ($n_e$) of light propagating in the direction parallel to the optical axis.

3. The optical film of claim 2, wherein the reactive mesogenic liquid crystal comprises at least one selected from a rod-shaped aromatic derivative comprising at least one reactive cross-linking group, propylene glycol 1-methyl, propylene glycol 2-acetate, and a compound represented by formula $P^1-A^1-(Z^1-A^2)_n-P^2$, wherein $P^1$ and $P^2$ are independently a polymerizable functional group selected from acrylate, methacrylate, acryloyl, vinyl, vinyloxy, epoxy, and a combination thereof, $A^1$ and $A^2$ are independently 1,4-phenylene, a naphthalene-2,6-diyl group, or a combination thereof, $Z^1$ is a single bond, —C(=O)O—, —(O=C)O—, or a combination thereof, and n is 0, 1, or 2.

4. The optical film of claim 3, wherein the photocurable liquid crystal emits ultraviolet rays having a wavelength ranging from 250 nanometers to 400 nanometers.

5. The optical film of claim 1, wherein the liquid crystal has an obliquely tilted optical axis with respect to the surface of the liquid crystal layer.

6. The optical film of claim 1, wherein the liquid crystal layer comprises:

a first side and a second side facing the first side, wherein a tilt angle of the liquid crystal becomes gradually larger from the first side to the second side.

7. The optical film of claim 6, wherein the maximum tilt angle of the liquid crystals ranges from 40° to 70°.

8. The optical film of claim 6, wherein the tilt angle of the liquid crystals positioned at the first side is greater than 0° and less than or equal to 5°.

9. The optical film of claim 6, further comprising an alignment layer contacting the first side of the liquid crystal layer.

10. The optical film of claim 1, wherein the polysiloxane is positioned on a surface of the liquid crystal layer.

11. The optical film of claim 1, wherein the liquid crystal comprises at least one selected from the group consisting of a first liquid crystal represented by Chemical Formula A, a second liquid crystal represented by Chemical Formula B, and a third liquid crystal represented by Chemical Formula C:

Chemical Formula A

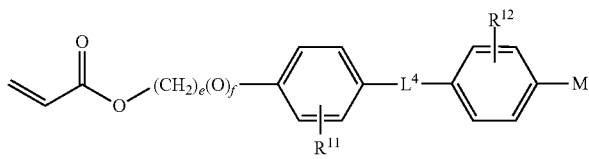

Chemical Formula B

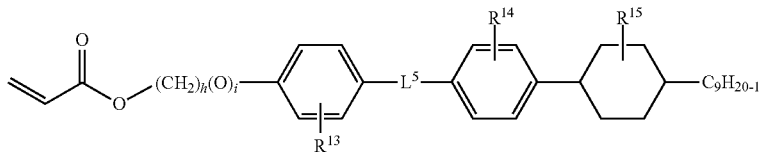

Chemical Formula C

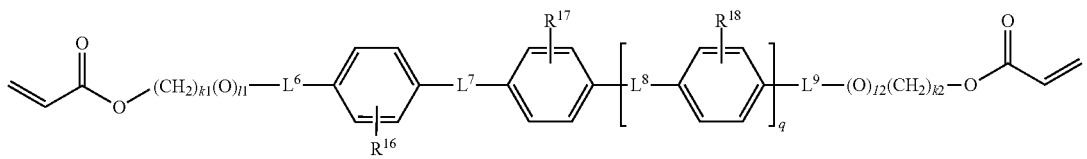

wherein, in Chemical Formulae A to C,

M is a cyano group, a cyano-containing group, a hydroxy group, a substituted or unsubstituted carboxyl group, or a combination thereof, $R^{11}$ to $R^{18}$ are each independently hydrogen, a substituted or unsubstituted C1 to C10 alkyl group, a substituted or unsubstituted C1 to C10 alkoxy group, a halogen atom, a halogen-containing group, or a combination thereof, $L^4$ to $L^9$ are each independently a single bond, —C(=O)O—, or —(O=C)O—, e, h, p, $k_1$, and $k_2$ are each independently 1 to 10, and f, i, $l_1$, $l_2$, and q are each independently 0 or 1.

12. The optical film of claim 11, wherein the liquid crystal comprises the first liquid crystal, the second liquid crystal, and the third liquid crystal, and wherein the liquid crystal comprises 10 to 35 percent by weight of the first liquid crystal, 10 to 35 percent by weight of the second liquid crystal, and 30 to 80 percent by weight of the third liquid crystal based on the total amount of the liquid crystal.

13. An antireflective film comprising:

the optical film of claim 1; and a polarizer positioned on the optical film.

14. A display device comprising:

a display panel; and the optical film of claim 1.

15. A display device comprising:

a display panel; and the antireflective film of claim 13.

\* \* \* \* \*